(12) United States Patent
Bochen

(10) Patent No.: US 8,601,890 B2
(45) Date of Patent: Dec. 10, 2013

(54) DRIVING DEVICE

(75) Inventor: Marian Bochen, Eitelborn (DE)

(73) Assignee: Stabilus GmbH, Koblenz (GB)

( * ) Notice: Subject to any disclaimer, the term of this patent is extended or adjusted under 35 U.S.C. 154(b) by 749 days.

(21) Appl. No.: 12/369,109

(22) Filed: Feb. 11, 2009

(65) Prior Publication Data

US 2010/0037527 A1    Feb. 18, 2010

(30) Foreign Application Priority Data

Feb. 12, 2008  (DE) .................. 10 2008 008 790

(51) Int. Cl.
- *F16H 3/06*   (2006.01)
- *F16H 27/02*  (2006.01)
- *F16H 29/02*  (2006.01)
- *F16H 29/20*  (2006.01)

(52) U.S. Cl.
USPC .................................... 74/89.38; 74/89.23

(58) Field of Classification Search
USPC ............................ 74/89.23, 89.32, 441, 89.38
See application file for complete search history.

(56) References Cited

U.S. PATENT DOCUMENTS

| | | | | |
|---|---|---|---|---|
| 4,192,203 | A * | 3/1980 | Dailey | 477/51 |
| 4,468,063 | A * | 8/1984 | Yukimoto et al. | 296/223 |
| 4,918,921 | A * | 4/1990 | Leigh-Monstevens et al. | 60/545 |
| 4,934,203 | A * | 6/1990 | Bailey et al. | 74/89.35 |
| 5,222,328 | A * | 6/1993 | Okumura | 49/340 |
| 6,145,396 | A * | 11/2000 | Ko | 74/89.23 |
| 7,288,930 | B2 * | 10/2007 | Clark | 324/174 |
| 2005/0160846 | A1 * | 7/2005 | Chiang | 74/89.35 |
| 2006/0279243 | A1 * | 12/2006 | Schachtl et al. | 318/466 |
| 2007/0062119 | A1 * | 3/2007 | Ritter | 49/343 |
| 2008/0257080 | A1 * | 10/2008 | Singh | 74/89.23 |
| 2011/0290050 | A1 * | 12/2011 | Kummer et al. | 74/89.37 |

FOREIGN PATENT DOCUMENTS

| | | |
|---|---|---|
| JP | 2001173826 | 6/2001 |
| JP | 2005188534 | 7/2005 |

* cited by examiner

*Primary Examiner* — Justin Krause
(74) *Attorney, Agent, or Firm* — Cozen O'Connor

(57) ABSTRACT

A driving device for a hatch in a motor vehicle includes a first fastening element which can be connected to a stationary structural component, a second fastening element which can be connected to a movable structural component, a spindle drive including a threaded spindle having an axis of rotation and a spindle nut arranged on the threaded spindle, and a rotary drive having a driveshaft for rotating spindle to move the first fastening element axially relative to the second fastening element. A stroke detection sensor for continuously detecting the position of the movable structural component includes a rotatable sensor element driven in rotation by the driveshaft and a stationary sensor element for continuously detecting the rotational position of the rotatable sensor element. A gear reduction unit is provided between the driveshaft and the rotatable sensor element so the revolutions of the sensor element are reduced by about 14:1.

12 Claims, 6 Drawing Sheets

DRIVING DEVICE

BACKGROUND OF THE INVENTION

1. Field of the Invention

The invention relates to a driving device, particularly for a hatch in a motor vehicle, having a first fastening element which can be connected to a stationary structural component, a second fastening element which can be connected to a movable structural component, a spindle drive including a threaded spindle with a spindle nut arranged thereon, a rotary drive with a driveshaft for rotating the spindle to move the first fastening element axially relative to the second fastening element, and a stroke detection sensor for detecting the position of the movable structural component.

2. Description of the Related Art

In a driving device of the type mentioned above, it is known to detect the stroke position by means of a linear potentiometer.

This construction requires a large installation space and a time-consuming construction. Further, the linear potentiometer is susceptible to dirt and therefore has only limited dependability in operation.

SUMMARY OF THE INVENTION

Therefore, it is an object of the invention to provide a driving device of the type mentioned above which has a compact and simple construction and is highly dependable in operation.

According to the invention, the stroke detection sensor is a continuous rotational position sensor with a stationary sensor element detecting the rotational position and a sensor element which is rotatable corresponding to the rotational position to be detected. The rotatable sensor element can be driven in rotation by the driveshaft by means of a reduction gear unit.

The rotatable sensor element can have diametrically magnetized permanent magnets, the stationary sensor element constructed as a magnetic field sensor being arranged radially relative to the rotatable sensor element.

The continuous stroke detection sensor also makes it possible to detect the actual stroke position of the driving device after an interruption of the power supply. A smaller structural size is made possible owing to its construction as a rotational position sensor.

In order that the rotatable sensor element only carries out a rotational movement of less than 360° at the greatest possible adjusting stroke, this reduction of the rotational movement of the rotatable sensor element is carried out by means of the reduction gear unit.

In a simple construction, the rotatable sensor element is a diametrically magnetized permanent magnet ring.

In order to measure with increased sensitivity, the permanent magnet ring can have a circumferential groove in its circumferentially extending outer surface area, the magnetic field sensor projecting into this groove.

Measurement with increased sensitivity also results when the stationary sensor element is arranged on a stationary sensor carrier. The sensor carrier is arranged substantially within the permanent magnet ring when the sensor carrier is an open disk arranged in the circumferential groove of the permanent magnet ring with its central opening at least approximately concentric to the permanent magnet ring.

The magnetic field sensor can be a magnetoresistive sensor or a Hall sensor.

In a very compact construction, the reduction gear unit has an annular gear, which is fixed with respect to relative rotation and which is drivable in a wobbling manner by an eccentric cam of the driveshaft, and a gear wheel arranged in the annular gear coaxial to the axis of rotation. The gear wheel has a smaller diameter than the inner diameter of the annular gear, engages with the ring gear and is drivable in rotation by the ring gear, the rotatable sensor element being drivable in rotation by the gear wheel.

In a simple manner, the annular gear can have a plurality of axial bore holes into which axially stationary pins having a circular cross section can project so as to allow the annular gear to move around the axis of rotation in a circular path caused by the eccentric cam while at the same time preventing a rotational movement. The diameter of the axial bore holes is greater than the diameter of the pins.

The reduction gear unit is preferably a toothed wheel gear unit.

The closer the number of teeth of the ring gear to that of the wheel and, therefore, the higher the transmission ratio, the more necessary it becomes to modify the shape of the teeth. For even higher gear ratios, the reduction gear unit is advantageously a friction gear unit.

Of course, any other suitable type of gear unit such as, e.g., cycloid gear units or harmonic drives can also be used.

When the stroke detection sensor and the reducing gear unit are arranged so as to form a constructional unit in a housing which is penetrated by the driveshaft, this constructional unit can be preassembled so as to facilitate assembly of the driving device.

In this connection, the annular gear, the gear wheel, and the permanent magnet ring can be arranged in a sandwich-type construction with respect to one another in the cup-shaped housing. The housing preferably has a housing cup which can be closed by a housing cover.

The rotary drive is preferably an electric motor, the spindle drive being drivable in rotation by its driveshaft.

For the purpose of decoupling the rotary drive from the spindle drive, the spindle drive can be rotatably driven by the rotary drive by means of a coupling, particularly a safety coupling.

To reduce speed and increase torque, the spindle drive can be rotatably driven by the rotary drive by means of a gear unit.

A compact construction is achieved when the rotary drive and/or the gear unit are/is fixedly arranged in a housing tube which extends coaxially to the axis of rotation.

For the purpose of a simple construction which can be mounted in any rotational position with respect to the axis of rotation, one or both of the fastening elements are a spherical head or a ball socket of a ball joint.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
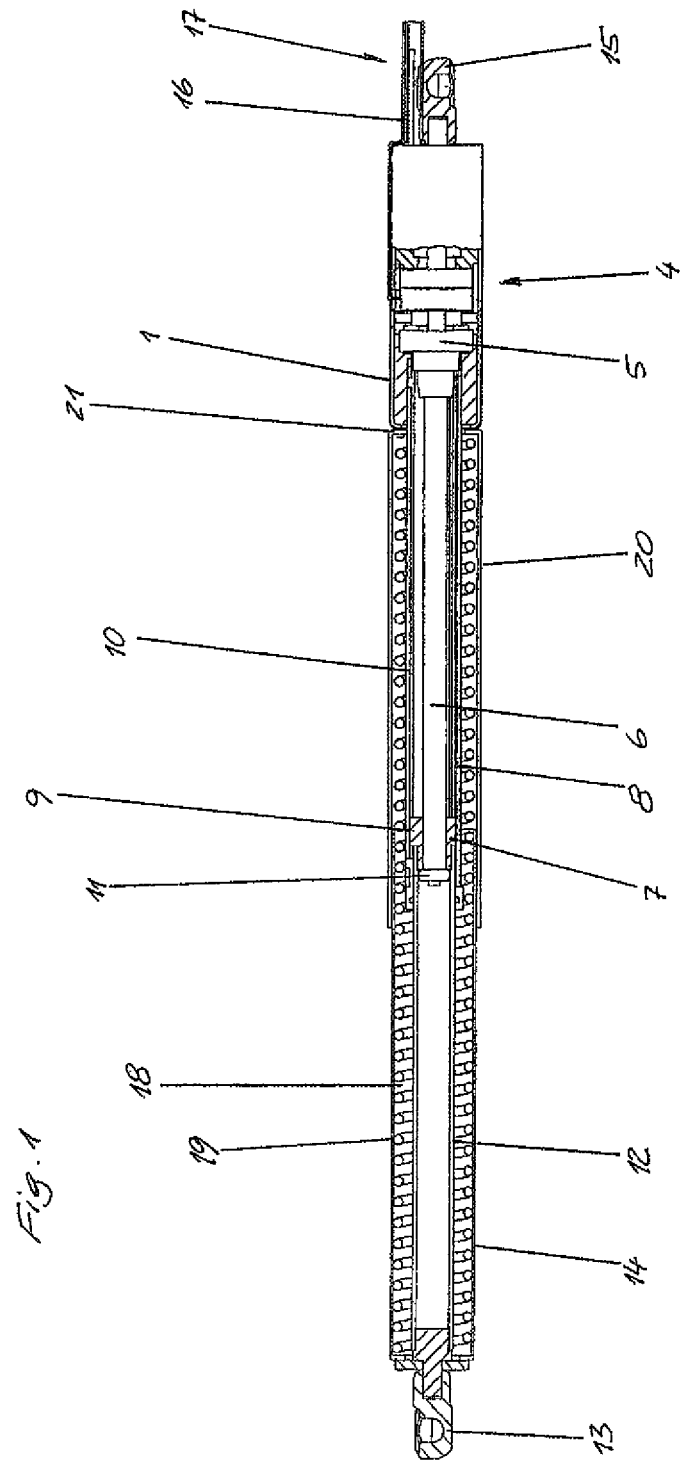
FIG. 1 shows a cross-sectional view of a driving device.
Figure 2:
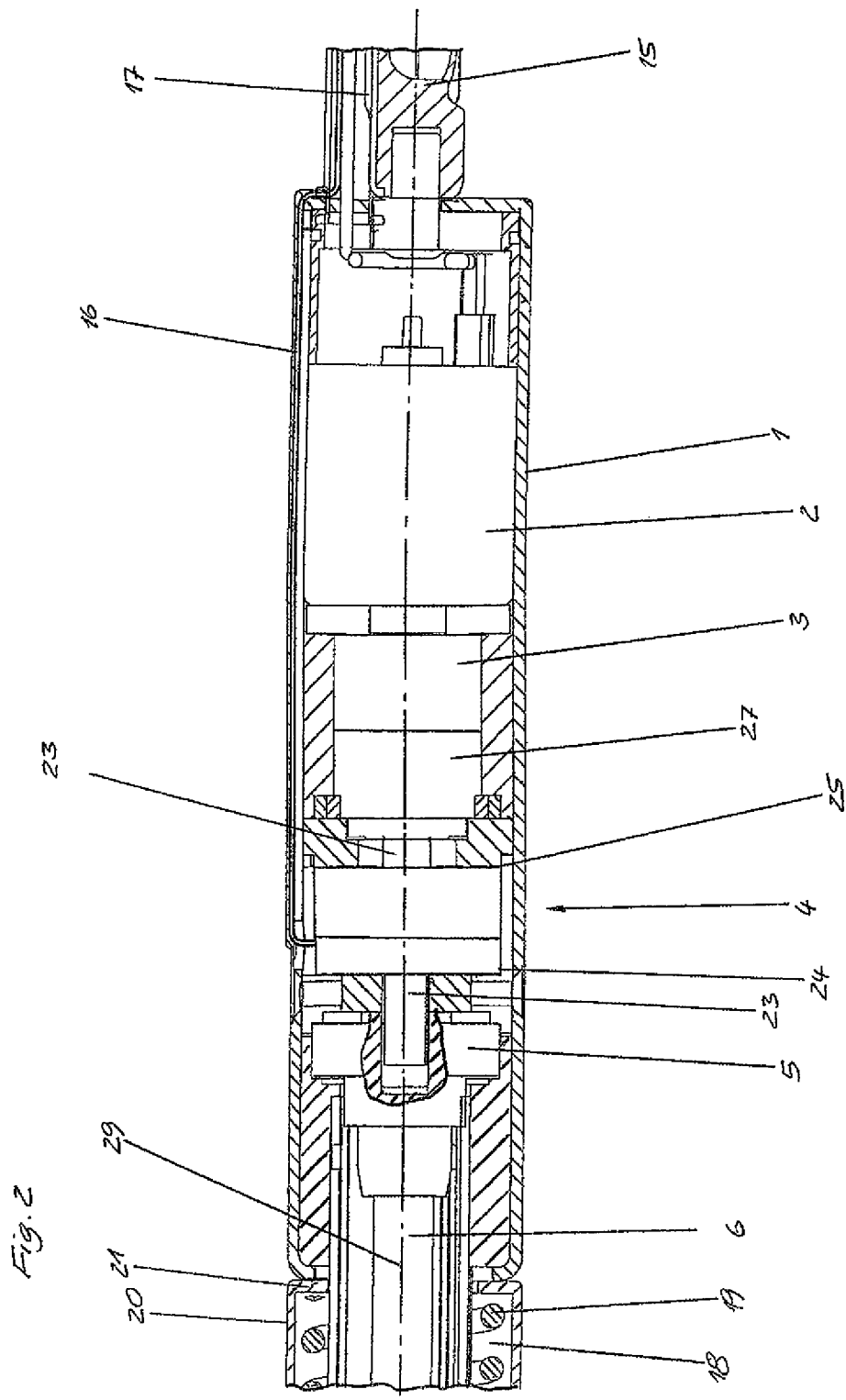
FIG. 2 shows an enlarged section through the driving device according to FIG. 1 in the area of the sensor unit.
Figure 3:
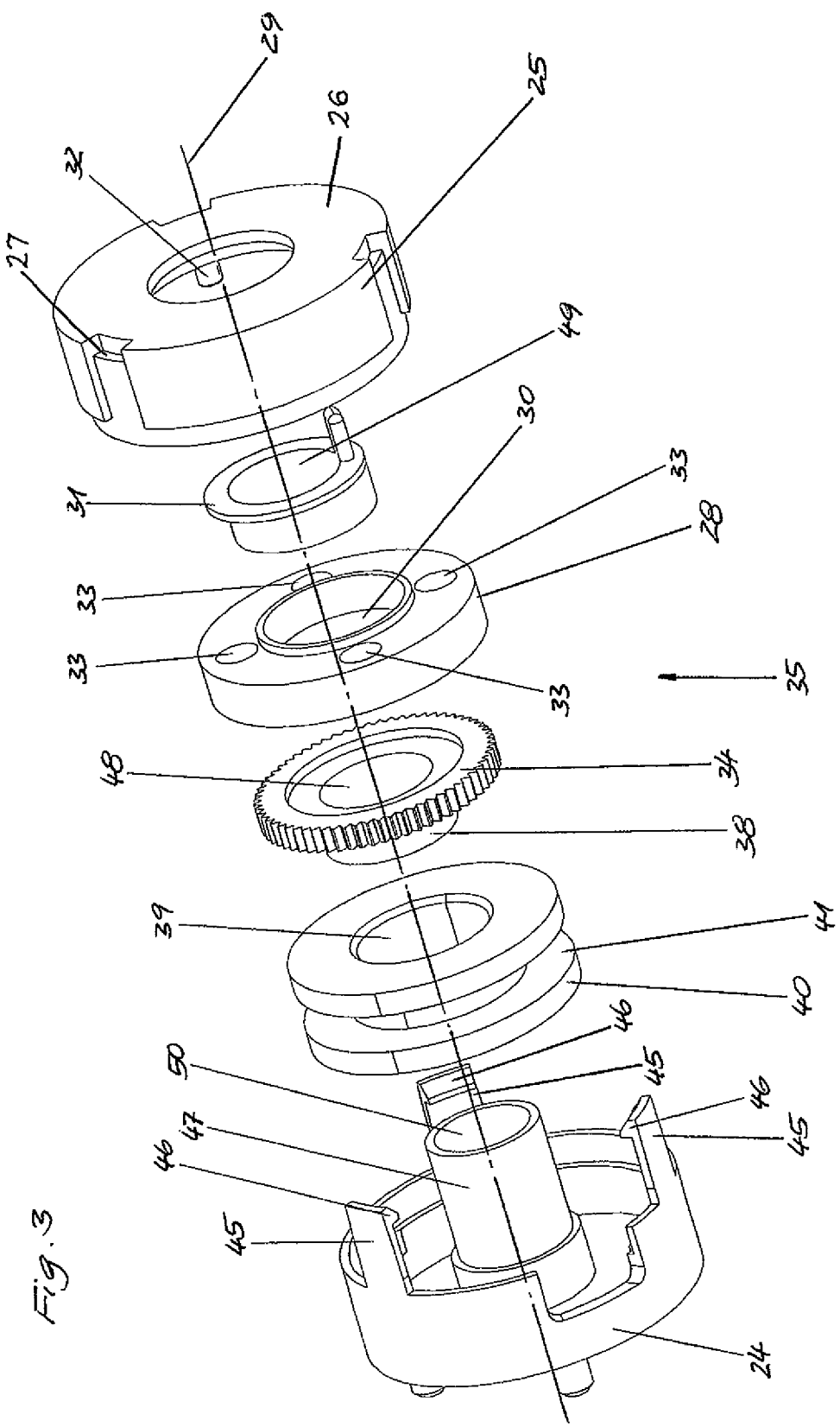
FIG. 3 shows a perspective exploded view of the sensor unit of the driving device according to FIG. 1 without the sensor carrier.
Figure 4:
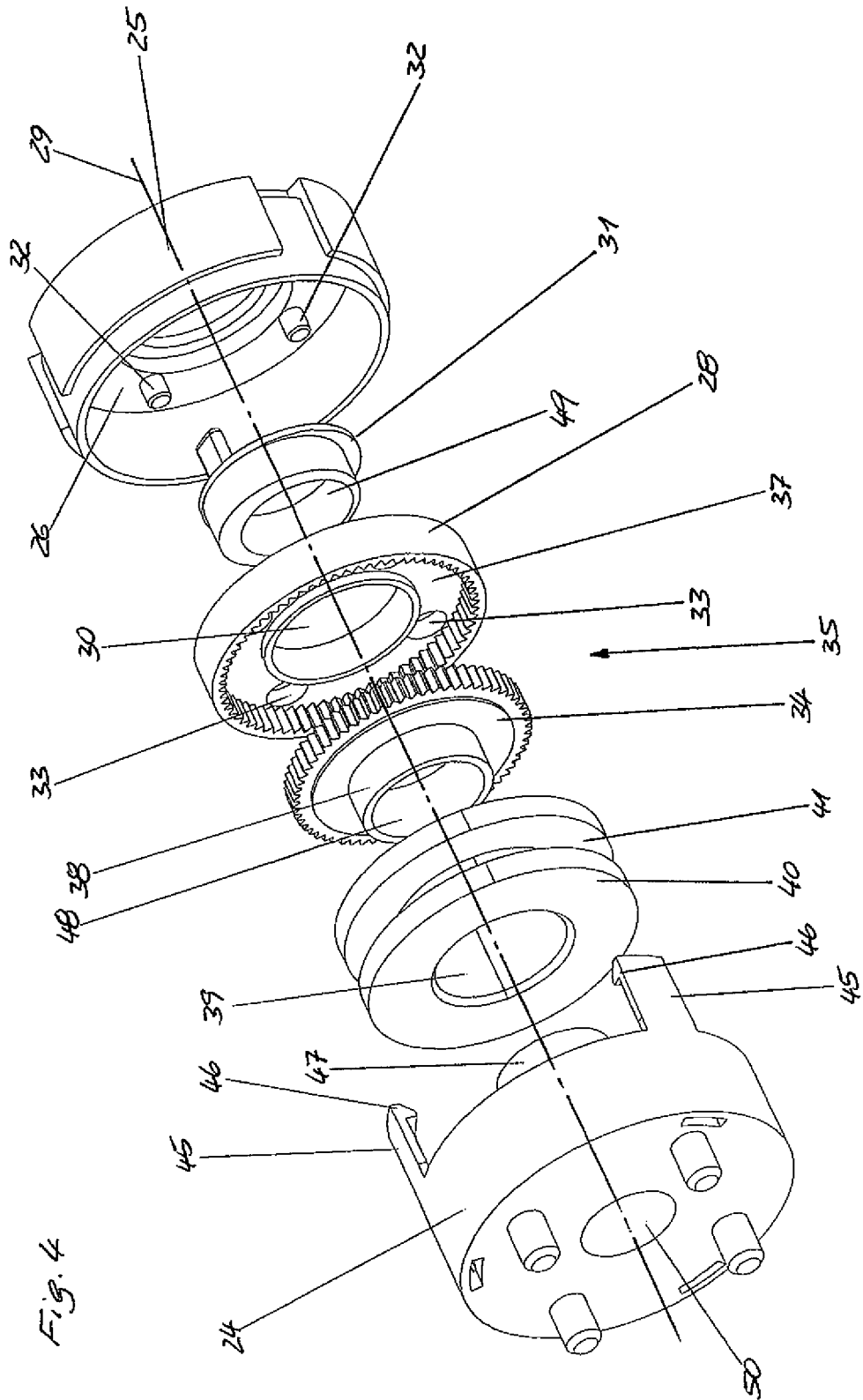
FIG. 4 shows another perspective exploded view of the sensor unit of the driving device according to FIG. 1 without the sensor carrier.
Figure 5:
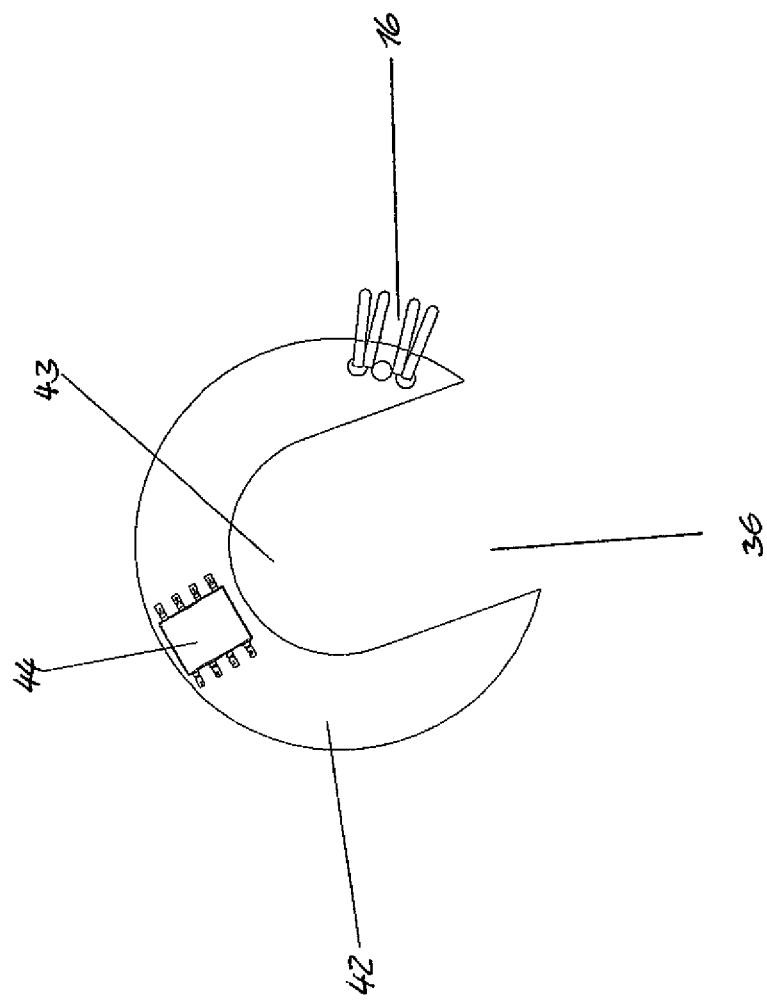
FIG. 5 shows a top view of a sensor carrier with a Hall sensor of the sensor unit according to FIG. 3.
Figure 6:
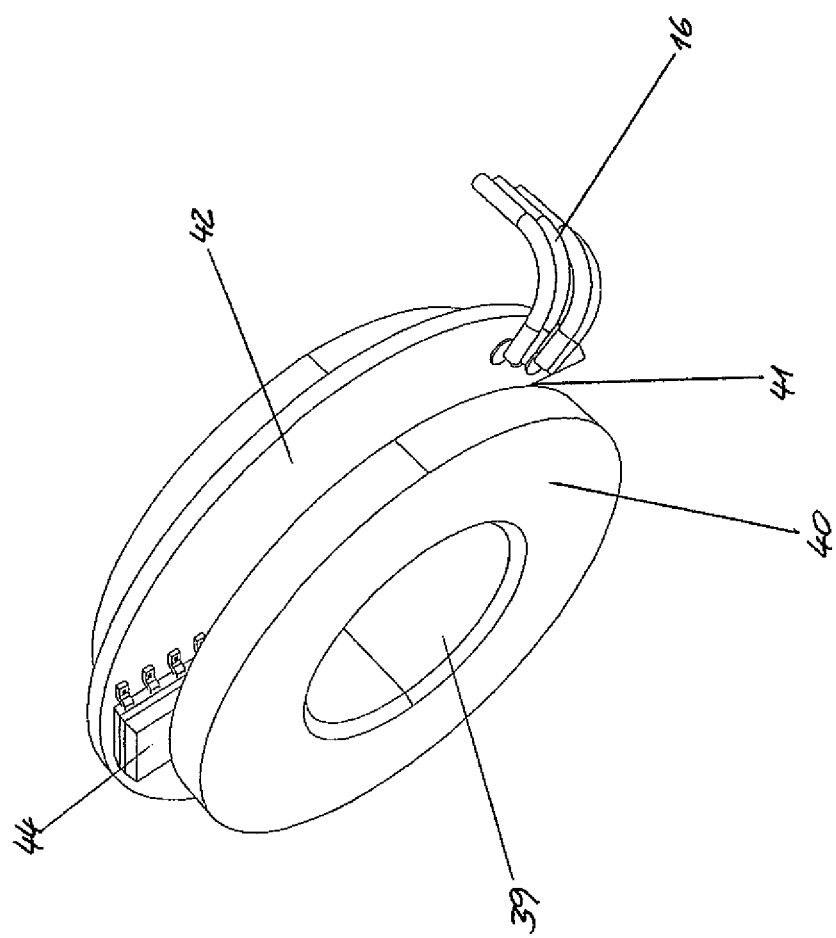
FIG. 6 shows a perspective view of a permanent magnet ring with sensor carrier of the sensor assembly according to FIG. 3.

The driving device shown in the drawings has a housing tube 1 in which an electric motor 2, a gear unit 3 which can be driven by the electric motor 2, a safety coupling 27, and a sensor assembly 4 are arranged in series one after the other.

The sensor assembly 4, which is constructed for measuring the absolute stroke position of a structural component part which is movable relative to a stationary structural component part, is followed in sequence by a spindle adapter 5 which is connected coaxially to a rotatably mounted threaded spindle 6.

A spindle nut 7 is arranged on the threaded spindle 6 so as to be axially displaceable in a guide tube 8 which is fixedly connected coaxially to the housing tube 1.

The spindle nut 7 engages in axial slots 10 at the inner wall of the guide tube 8 by supporting pins 9 which project out radially so that the spindle nut 7 is fixed with respect against rotation relative to the guide tube 8.

The threaded spindle 6 has a guide piece 11 at its free end by which the threaded spindle 6 is guided in a spindle tube 12 so as to be axially displaceable. The spindle tube 12 has the spindle nut 7 at one end and a first ball socket 13 forming a fastening element at its other end remote of the threaded spindle 6.

An outer tube 14 has one end fastened to the spindle tube 12 in the area of the first ball socket 13, and encloses the spindle tube 12 coaxially at a distance. The other end projects into a spring sleeve 20 and is guided therein so as to be axially displaceable. The spring sleeve 20 has at one end a collar 21 which is directed inward radially and by which it contacts the housing tube 1 axially.

Arranged at the end of the housing tube 1 opposite to the first ball socket 13 there is a second ball socket 15 forming a second fastening element and a plug-in connection 17 for the power supply of the electric motor 2 and for the signal lines 16 which lead from the sensor assembly 4 to the plug-in connection 17 in the housing tube 1.

A helical compression spring 19 has one end supported against an inwardly directed collar 22 of the outer tube 14, its other end supported against the collar 21 of the spring sleeve 20. The spring 19 is arranged in the annular space 18 formed between the spindle tube 12 and the outer tube 14 at one end, and between the guide tube 8 and spring sleeve 20 at the other end.

By means of the ball sockets 13 and 15, the driving device can be connected in an articulated manner to a stationary body part of a motor vehicle and to a movable structural component part of the motor vehicle that is constructed as a hatch.

The sensor assembly 4 is penetrated coaxially by a driveshaft 23 which is mounted so as to be rotatable around an axis of rotation 29 and which can be rotatably driven by the electric motor 2 by a multitooth shaft by means of the gear unit 3 and the safety coupling 27 and through which this rotational movement can be transmitted to the threaded spindle 6 by the spindle adapter 5.

The sensor assembly 4 can be arranged preassembled in a cylindrical housing with a housing cup 25 that can be closed by a housing cover 24.

An annular gear 28 formed as an internal gear is supported at the motor-side base 26 of the housing cup 25. This annular gear 28 is arranged so as to be rotatable on an eccentric cam 31 of the driveshaft 23 by a coaxial bore hole 30 so that the gear 28 executes an eccentric motion during a rotation of the driveshaft 23.

To prevent the annular gear 28 from being carried along in rotation, four pins 32 having a circular cross section and projecting axially at the base 26 of the housing cup 25 protrude into axial bore holes 33 of the annular gear 28. The diameter of the axial bore holes 33 is greater than the diameter of the pins 32 by twice the amount of the eccentricity of the eccentric cam 31.

Accordingly, during a rotation of the driveshaft 23 the annular gear 28 is driven by the eccentric cam 31 in a wobbling motion without rotation.

In the interior of the annular gear 28, a gear wheel 34 formed as an external gear and having a diameter smaller than the inner diameter of the annular gear 28 is arranged coaxial to the axis of rotation 29. At an area along the circumference, this gear wheel 34 engages the annular ring 28 and forms a reduction gear unit 35 with the gear 28. This engagement area moves during the wobbling motion of the gear 28 and accordingly generates a reduction of the rotational movement of the driveshaft 23 of, e.g., 14:1.

The gear wheel 34 is axially supported at the disk part 37 of the ring gear 28 having the coaxial bore hole 30.

The wheel 34 has a cylindrical coaxial projection 38 which projects toward the side remote of the ring gear 28 and on which a diametrically magnetized permanent magnet ring 40 is attached in a frictional engagement by a concentric bore hole 39.

The permanent magnet ring 40 has a circumferential groove 41 in its radially circumferential outer surface.

In the groove 41, a sensor carrier 42 which is formed as an open disk is fitted with its central opening 43 in a concentric position relative to the permanent magnet ring 40 by a radial opening 36 and is arranged so as to be stationary.

A Hall sensor 44 which detects the rotational position of the wheel 34 by the relative orientation of the magnetic field of the permanent magnet ring 40 is arranged on the sensor carrier 42 and supplies a corresponding rotational position signal to the plug-in connection 17 via the signal lines 16.

The correct rotational position signal is also made available again immediately after an interruption of the power supply.

The housing cover 24 has a plurality of catch arms 45 which are uniformly distributed at its outer circumference and project axially relative to the housing cup 25. In the assembled state of the housing, the catch arms 45 engage behind shoulders 27 in the outer edge of the base 26 of the housing cup 25 by catches 46 arranged at their free ends.

Further, the housing cover 24 has a pipe connection piece 47 which projects concentric to the housing cup 25. The permanent magnet ring 40 with its concentric bore hole 39, the wheel 34 with a coaxial bore hole 48, and the eccentric cam 31 with another coaxial bore hole 49 are rotatably mounted on the pipe connection piece 47.

The driveshaft 23 is guided through the through-opening 50 of the pipe connection piece 47.

The invention is not limited by the embodiments described above which are presented as examples only but can be modified in various ways within the scope of protection defined by the appended patent claims.

I claim:

1. A driving device for a hatch in a motor vehicle, the device comprising:

a first fastening element configured for connection to a stationary structural component;

a second fastening element configured for connection to a movable structural component;

a spindle drive comprising a threaded spindle having an axis of rotation and a spindle nut arranged on the threaded spindle;

a rotary drive comprising a driveshaft for rotating said threaded spindle about said axis of rotation to move the first fastening element and the second fastening element axially with respect to each other;

a stroke detection sensor for continuously detecting the position of the movable structural component, the stroke detection sensor comprising a rotatable sensor element driven in rotation by the driveshaft and a stationary sensor element for continuously detecting the rotational position of the rotatable sensor element;

a gear reduction unit between the driveshaft and the rotatable sensor element; and a safety coupling configured between the rotary drive and the spindle, wherein the safety coupling can be opened, wherein the gear reduction unit comprises:

an annular gear which is fixed against rotation, the annular gear having an inside diameter;

an eccentric cam fixed to the driveshaft for driving the annular gear to wobble;

a gear wheel having an external diameter which is smaller than the inner diameter of the annular gear, wherein the gear wheel engages the annular gear so that the gear wheel rotates less than the drive shaft, wherein the rotatable sensor element is driven to rotate by the gear wheel.

2. The driving device of claim 1 wherein the rotatable sensor element comprises diametrically opposed permanent magnets, the stationary sensor element comprising a magnetic field sensor arranged radially with respect to the rotatable sensor element.

3. The driving device of claim 2 wherein the magnetic field sensor is either a magnetoresistive sensor or a Hall sensor.

4. The driving device of claim 2 wherein the rotatable sensor element is a diametrically magnetized permanent magnet ring.

5. The driving device of claim 4 wherein the permanent magnet ring has a circumferential groove, the magnetic field sensor projecting into said groove.

6. The driving device of claim 5 further comprising a stationary sensor carrier configured as an open annular disk received in the circumferential groove, the stationary sensor being arranged on the stationary sensor carrier.

7. The driving device of claim 1 wherein the annular gear has a plurality of bore holes with a diameter, each bore hole receiving a stationary pin having a diameter, wherein the diameter of the bore holes is larger than the diameter of the pins by twice the eccentricity of the eccentric cam.

8. The driving device of claim 1 wherein the gear reduction unit is one of a toothed gear unit and a friction gear unit.

9. The driving device of claim 1 further comprising a housing containing the stroke detection sensor and the gear reduction unit so as to form a structural unit penetrated by the driveshaft.

10. The driving device of claim 1 further comprising a gear unit between the rotary drive and the spindle.

11. The driving device of claim 10 further comprising a housing tube in which the rotary drive and the gear unit are arranged.

12. A driving device for a hatch in a motor vehicle, the device comprising:

a first fastening element configured for connection to a stationary structural component;

a second fastening element configured for connection to a movable structural component;

a spindle drive comprising a threaded spindle having an axis of rotation and a spindle nut arranged on the threaded spindle;

a rotary drive comprising a driveshaft for rotating said threaded spindle about said axis of rotation to move the first fastening element and the second fastening element axially with respect to each other;

a stroke detection sensor for continuously detecting the position of the movable structural component, the stroke detection sensor comprising a rotatable sensor element driven in rotation by the driveshaft and a stationary sensor element for continuously detecting the rotational position of the rotatable sensor element;

a gear reduction unit between the driveshaft and the rotatable sensor element; and a safety coupling configured between the rotary drive and the spindle, wherein the safety coupling can be opened, wherein the rotatable sensor element comprises diametrically opposed permanent magnets, the stationary sensor element comprising a magnetic field sensor arranged radially with respect to the rotatable sensor element, wherein the rotatable sensor element is a diametrically magnetized permanent magnet ring, the device further comprising a cup-shaped housing containing an annular gear, a gear wheel, and the permanent magnet ring in a layered structure.

* * * * *